US008314715B2

(12) United States Patent
Werpooler

(10) Patent No.: US 8,314,715 B2
(45) Date of Patent: Nov. 20, 2012

(54) METHOD AND DEVICE FOR A KEY HOLDER

(76) Inventor: Lior Werpooler, Kfar Saba (IL)

( * ) Notice: Subject to any disclaimer, the term of this patent is extended or adjusted under 35 U.S.C. 154(b) by 368 days.

(21) Appl. No.: 12/206,779

(22) Filed: Sep. 9, 2008

(65) Prior Publication Data

US 2009/0231154 A1 Sep. 17, 2009

(51) Int. Cl.

| | |
|---|---|
| ***G08B 21/00*** | (2006.01) |
| ***G08B 1/08*** | (2006.01) |
| ***B60Q 1/00*** | (2006.01) |
| *E05B 17/00* | (2006.01) |

(52) U.S. Cl. ............. 340/686.1; 340/309.7; 340/539.32; 340/457; 70/431

(58) Field of Classification Search ............... 340/686.6, 340/309.7, 539.32, 457
See application file for complete search history.

(56) References Cited

U.S. PATENT DOCUMENTS 3,891,980 A * 6/1975 Lewis et al. .................. 340/5.62
7,009,522 B2 * 3/2006 Flanagan et al. .............. 340/666

* cited by examiner

*Primary Examiner* — Donnie Crosland

(57) ABSTRACT

An electronic device that would remind the user to place his keys on a fixed place to avoid the inconvenience of forgetting where placing and searching after those keys. The device consists of a receiver that would be placed in a fixed place and of a fitted transmitter that would be attached to a key chain. When the keys with the attached transmitter would be in a proximity to the receiver there would be an alert or a reminder to place the keys, the transmitter, on the wall mounted key holder that the receiver is attached too.

14 Claims, 3 Drawing Sheets

METHOD AND DEVICE FOR A KEY HOLDER

FIELD OF THE INVENTION

This invention is in the field of electronic devices to avoid the inconvenience of forgetfulness and in particular a device that makes an alert when entering the house or office with a key that should be hung on the key holder.

BACKGROUND OF THE INVENTION

There are items used jointly by members of a house or office and if those items are not placed on the agreed place it can be very frustrating for the person who needs that item if it was not returned to its place by the previous user.

This innovation could apply to any such item for example, a jointly used firearm in a police station, but this specification will refer to one common example, namely, keys and bunches of keys.

Even if a key is not jointly used a person often desires that his keys are kept in a central place in his house so that he knows where they are when he leaves the house. The person would make a habit of picking up his key as he leaves his house. There would not be a fear as the key user rushes out of the house to an appointment, that he left his keys in another suit or on his bedside table upstairs.

For jointly used keys the use of this innovation is very pertinent as it can be very annoying and sometimes real damage can caused by one key user not returning the key to its agreed place and then not being accessible when contacting him to return the key to its place.

This innovation reveals a solution for this problem.

SUMMARY OF THE INVENTION

It is to be understood that both the foregoing general description and the following detailed description present embodiments of the invention and are intended to provide an overview or framework for understanding the nature and character of the invention as it is claimed.

This invention reveals a device that would remind a key user to place his key in a specific place when the key user enters the house or office, so when the user would leave the house or the office he would not need to look for his key.

The invention consists of a receiver that would be attached on a wall mounted key holder and of a fitted transmitter that would be attached to a key chain. When the keys with the attached transmitter would be in a proximity to the receiver there would be an alert or a reminder to place the key, the transmitter, on the wall mounted key holder, the receiver. So for example if the wall mounted key holder with the receiver would be placed next to the door, when entering the room the receiver would catch the transmitted signals from the transmitter attached to the key chain and would provide an alert reminding to place the key chain with the transmitter on the wall mounted key holder with the receiver in a fixed place ready to be taken when needed, so when leaving the house the user would not need to look for his keys.

The reminder might be of a sound for example a buzz, music, vocal message or advertising slogan. The wall mounted key holder then would have a loudspeaker.

The reminder might also be of a visual effect for example a flashing light, the lighting of a message or an advertising slogan. The wall mounted key holder then would have light bulbs or LED lights and/or a digital screen to display the visual effects.

The digital screen might also be used to show the time and or other messages.

The transmitter and/or receiver would have an operated button for activation. There could also be an option for activation by voice recognition technology.

A means to deactivate the sound or visual effects would also be added. This deactivation could take place when the key is hung on the hook of the wall mounted key holder or when the magnetized portion of the key ring is placed on an opposite pole magnetized portion on the wall mounted key holder.

The transmitter could be made or made adjustable so that distance of, for example, two meters would enable the receiver on the wall mounted key holder to catch the transmitted signals of the transmitter on the key ring.

A delay time of, for example a few seconds, from when the key ring with its transmitter is removed from the wall mounted key holder be added in order to prevent the sound or visual effects commencing immediately upon such removal.

There might also an option of locking the key on the wall mounted key holder to prevent unauthorized use. The release of the key from the holder could be for example, by voice recognition technology, a code on a number pad or fingerprint identification. Unauthorized removal of the keys could activate an alarm for example, an audible alarm, an SMS message on the rightful key owner's mobile phone, an email message on a computer. Such options would require the appropriate technology well known in the art.

For the aspects of this invention, this invention would be able to operate with more than one set of keys. Each set would have its place on the wall mounted key holder and each would operate with a different wavelength transmitter and receiver. Each set of key ring and wall mounted key holder would use a different wavelength in order to prevent a strangers key transmitter setting off the vocal and visual effects as he entered the house of a user of this invention. There might be a possibility for a message to be announced through the loudspeaker of the wall mounted key holder when the key is returned to its place on the said holder, for example "Good morning" or "Good evening" depending on the time of day. A programmable micro-processor could be used to change the greeting.

Another object of this invention is for companies to advertise their wares using this invention. For example, the announcement of the previous object of this invention could be "Enjoy a cool C . . . berg beer from the fridge".

There would also be a possibility to add more sophisticated formats as an internet connection whereby a person could leave a message for the person who takes keys for example, "Do not forget to pick up the dry cleaning" or leave a message for the person when they return the keys to the wall mounted key holder, for example, "Please switch on the hot water boiler. I will be home at 10 pm". The message could be displayed and/or audible. If there is more than one key holder position each with its wavelength as described above then the message could be left only for the person taking or returning their keys. Alternatively, the message could be a universal message designed for all key users to receive.

Furthermore, a micro-processor might be added to record and retrieve various information for example, the time the user of the keys left and returned. This information is taken from the time the keys were taken and the time they were returned. This information would be useful for example, to a company whose staffs use keys to drive company vehicles. More sophisticated equipment could include recording in the key holder the maximum speed or average speed of the vehicle used with those keys and also the places visited by the vehicle. This information could be transferred automatically to the recording station in the wall mounted key holder and be retrievable when desired.

BRIEF DESCRIPTION OF THE DRAWINGS

The accompanying drawings are included to provide a further understanding of the invention and are incorporated into and constitute a part of this specification. The drawings illustrate various embodiments of the invention and, together with the description, serve to explain the principles and operations of the invention, by way of example only and not to limit the invention to these descriptions only.

DETAILED DESCRIPTION OF THE PREFERRED EMBODIMENTS

As will be appreciated the present invention is capable of other and different embodiments than those discussed above and described in more detail below, and its several details are capable of modifications in various aspects, all without departing from the spirit of the invention. Accordingly, the drawings and description of the embodiments set forth below are to be regarded as illustrative in nature and not restrictive.

Figure 1:
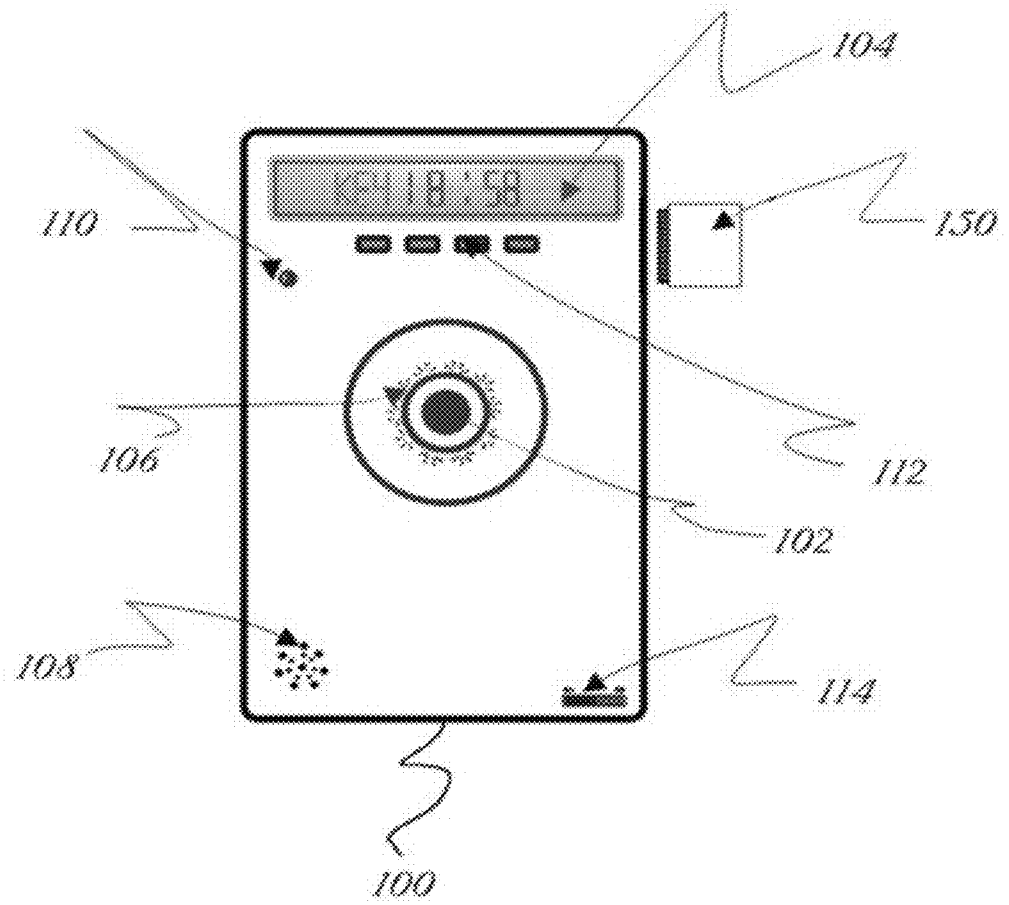
FIG. 1 is a diagram of a wall mounted key holder with a receiver.

FIG. 1 shows the wall mounted key holder with the attached receiver 100. The key holder 100 has a magnetic center piece 102 with a sensor 106 to detect when the corresponding magnetic portion of the key ring, holding one or more keys, is attached to the holder 100 and detects when the key ring is removed.

There is a digital screen 104 that could display the time and other information. Also included is a microphone 106, a loudspeaker 108, an indicating light 110, setting buttons 112 and the battery charge indicator 114. An additional micro-processor 150 could be also connected.

Figure 2:
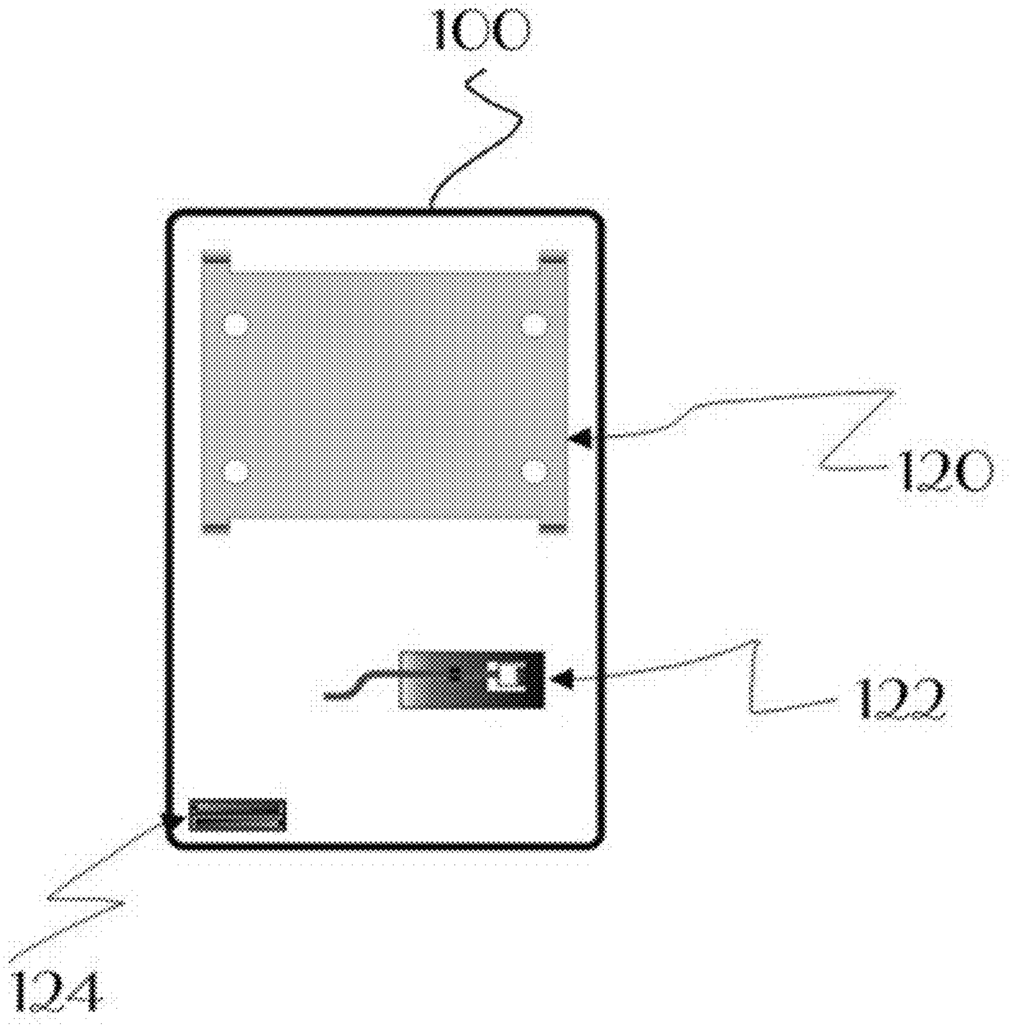
FIG. 2 is diagram of the reverse side of the wall mounted key holder.

FIG. 2 shows the reverse side of the holder 100 with an attachment plate 120, an internet connection 122 and a battery housing 124.

Figure 3:
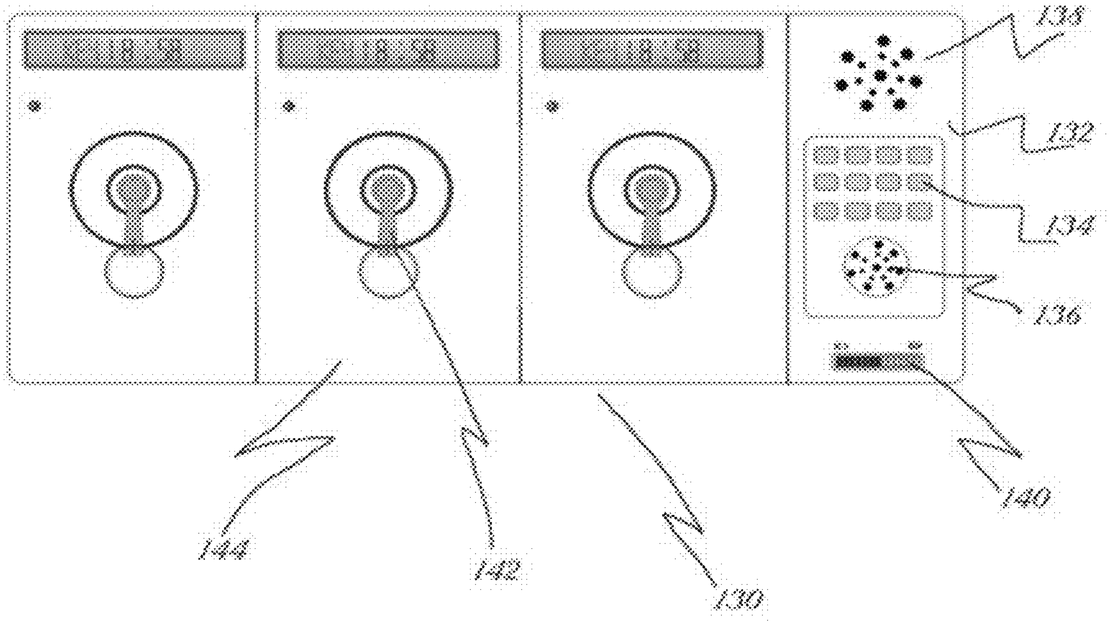
FIG. 3 is a diagram of a multiple wall mounted key holder with key rings attached and micro-processor programming buttons.

FIG. 3 shows a wall mounted key holder for three keys 130 with a micro-processor 132 attached, with control buttons 134, a microphone 136, loudspeaker 138 and a battery charge indicator 140.

Each key ring and key 142 is magnetically attached to its holder 144. The key holder 144 could be made to make a sound if the key were attached to the wrong holder. The different wavelengths would identify if a key were placed on the wrong holder.

What is claimed:

1. A system for reminding a key user to place his key in a specific place, said system comprising:

a. a fixed wall mounted key holder;

b. a receiver attached to said wall mounted key holder;

c. a transmitter attached to a key chain, said transmitter including a certain wavelength tuned to said receiver;

d. means for placing said key chain with said transmitter on said wall mounted key holder with said receiver;

e. means for activation or deactivation of said transmitter and receiver; and f. a power source, wherein, when said transmitter is in proximity to said receiver an alert is issued reminding said user to place said key chain on said wall mounted key holder.

2. The system for reminding a key user to place his key in a specific place as claimed in claim 1 wherein said means for placing said key chain on said wall mounted key holder comprises magnets.

3. The system for reminding a key user to place his key in a specific place as claimed in claim 1 wherein said power source comprises at least one selected from a group consisting of the following: a. a battery; and b. a connection to external electricity power source.

4. The system for reminding a key user to place his key in a specific place as claimed in claim 1 wherein said alert comprises at least one of a group consisting of the following options:

a. a vocal alert; and b. a visual alert.

5. The system for reminding a key user to place his key in a specific place as claimed in claim 1 wherein said wall mounted key holder further includes at least one of the group consisting of:

i. a light bulb or a LED light for visual alert;

ii. a loudspeaker for vocal alert;

iii. a digital screen;

iv. a micro processor;

v. activation by voice recognition technology;

vi. a locking mechanism of said key chain on said holder; and vii. an internet connection.

6. The system for reminding a key user to place his key in a specific place as claimed in claim 1 wherein said transmitter and receiver are configured to comprise at least one of the following program possibilities for activation:

a. receiving transmitted signals from said transmitter when said transmitter is at a specific fixed distance from said receiver;

b. providing a fixed time for when said alert is activated; and c. activating said alert after a delay time from when removing said key chain from said wall mounted key holder.

7. The system for reminding a key user to place his key in a specific place as claimed in claim 1 further including being configured to provide visual or vocal advertisements of commercial companies.

8. A system for reminding a key user to place his key in a specific place, said device comprising a. a fixed wall mounted key holder;

b. at least two receivers attached to said wall mounted key holder;

c. at least two transmitters attached to key chains, each of said transmitters having a different wavelength tuned to a corresponding one of said receivers;

d. means for placing said key chains with said receivers on said wall mounted key holder;

e. means for activation or deactivation of said transmitters and receivers; and f. a power source, wherein, when said transmitters are in proximity to said tuned receivers an alert is activated.

9. The system for reminding a key user to place his key in a specific place as claimed in claim 8 wherein said means for placing said key chain on said wall mounted key holder comprises magnets.

10. The system for reminding a key user to place his key in a specific place as claimed in claim 8 wherein said power source comprises at least one selected from a group consisting of the following;

a. a battery; and b. a connection to external electricity power source.

11. The system for reminding a key user to place his key in a specific place as claimed in claim 8 wherein said alert comprises at least one of a group consisting of the following options:

a. a vocal alert; and b. a visual alert.

12. The system for reminding a key user to place his key in a specific place as claimed in claim 8 wherein said wall mounted key holder further includes at least one of a group consisting of the following options:

i. a light bulb or a LED light for visual alert;

ii. a loudspeaker for vocal alert;

iii. a digital screen;

iv. a micro processor;

v. activation by voice recognition technology;

vi. a locking mechanism of said key chain on said holder; and vii. an internet connection.

13. The system for reminding a key user to place his key in a specific place as claimed in claim 8 wherein said transmitters and receivers include at least one selected from a group consisting of the following program possibilities for activation:

a. receiving transmitted signals from said transmitters when said transmitters are at a specific fixed distance from said corresponding tuned receivers;

b. providing a fixed time for when said alert is activated; and c. activating said alert after a delay time from when removing said key chains from said wall mounted key holder.

14. The system for reminding a key user to place his key in a specific place as claimed in claim 8 further including being configured to provide visual or vocal advertisements of commercial companies.

* * * * *

UNITED STATES PATENT AND TRADEMARK OFFICE

CERTIFICATE OF CORRECTION

PATENT NO. : 8,314,715 B2
APPLICATION NO. : 12/206779
DATED : November 20, 2012
INVENTOR(S) : Lior Werpooler It is certified that error appears in the above-identified patent and that said Letters Patent is hereby corrected as shown below:

On the Title page, insert in the section marked

Immediately after the "Prior Publication Data" section, please insert "Related U.S. Application Data" section

(60) Insert --Provisional application No. 60/993,371, filed September 13, 2007.--

Signed and Sealed this
Thirtieth Day of July, 2013

Teresa Stanek Rea
*Acting Director of the United States Patent and Trademark Office*